(12) United States Patent
Nashirozawa

(10) Patent No.: US 6,647,097 B1
(45) Date of Patent: Nov. 11, 2003

(54) TELEPHONE SYSTEM FOR VOICE RECOGNITION

(75) Inventor: Masami Nashirozawa, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/082,160

(22) Filed: May 20, 1998

(30) Foreign Application Priority Data

Jun. 19, 1997 (JP) .............................................. 9-178975

(51) Int. Cl.[7] .............................. H04M 1/64; H04M 3/42
(52) U.S. Cl. ................................ 379/88.01; 379/88.02; 379/88.03; 379/88.07; 379/88.16; 379/201.01; 379/201.02
(58) Field of Search .......................... 379/88.01, 88.03, 379/88.16, 90.01, 93.17, 201, 210, 216, 355, 356, 419, 142, 211, 88.02, 88.04, 88.06, 88.07, 93.01, 201.01, 201.02, 201.07, 355.01; 704/239, 240, 241, 243, 251, 254, 260; 369/25, 26, 29, 34

(56) References Cited

U.S. PATENT DOCUMENTS

| 4,928,302 A | * | 5/1990 | Kaneuchi et al. ............... 379/88 |
| 5,325,421 A | * | 6/1994 | Hou et al. ...................... 379/67 |
| 5,483,579 A | * | 1/1996 | Stogel ....................... 379/88.03 |
| 5,594,784 A | * | 1/1997 | Velius .......................... 379/88 |
| 5,652,789 A | * | 7/1997 | Miner et al. .................. 379/201 |
| 5,892,813 A | * | 4/1999 | Morin et al. ............... 379/88.01 |
| 5,905,789 A | * | 5/1999 | Will ............................ 379/211 |
| 5,912,949 A | * | 6/1999 | Chan et al. ............... 379/88.03 |
| 5,924,070 A | * | 7/1999 | Ittycheriah et al. ........... 704/275 |
| 5,930,336 A | * | 7/1999 | Junqua et al. ............ 379/88.03 |
| 6,208,713 B1 | * | 3/2001 | Rahrer et al. ............... 379/67.1 |
| 6,236,715 B1 | * | 5/2001 | Wong ....................... 379/88.03 |

FOREIGN PATENT DOCUMENTS

| CN | 2136559 Y | 6/1993 |
| CN | 2192107 Y | 3/1995 |
| GB | 2 317 781 A | 4/1998 |
| GB | 2 317 782 A | 4/1998 |
| JP | 2-220545 | 9/1990 |
| JP | 8-340378 | 12/1996 |
| JP | 6-2849 | 2/2000 |

* cited by examiner

Primary Examiner—Allan Hoosain
(74) Attorney, Agent, or Firm—Pearne & Gordon LLP

(57) ABSTRACT

A telephone set 2 to be connected to a main unit 1 of a private branch exchange or a key service unit includes therein a verbal telephone directory memory section 28d which stores information relating to the voice of the user and information relating to telephone numbers, a control section 28a which recognizes the user's input voice on the basis of the voice information and controls a dialing operation on the basis of the phone-number information, and a predetermined guidance memory section 28c which stores predetermined guidance used for giving instructions to the user in the form of voice or an indication.

2 Claims, 3 Drawing Sheets

TELEPHONE SYSTEM FOR VOICE RECOGNITION

BACKGROUND OF THE INVENTION

The present invention relates to a telephone system for voice recognition which permits verbal dialing of a telephone number by recognizing the voice of the user of the telephone system.

An existing private branch exchange (PBX) or a key service unit (KSU) has the main unit equipped with a control section and a verbal telephone directory data storage section, both being provided for the purpose of fulfilling a voice recognition function. Verbal dialing of a telephone number can be effected by verbally accessing the verbal telephone directory data storage section over the telephone.

FIG. 3 is a block diagram showing the configuration of an existing key service unit having a voice recognition function. A main unit 1 comprises a system control section 12, and the system control section 12 is connected to a station circuit interface 13 to be connected to a station circuit, an extension interface 14 to be connected to the key service unit 2, a voice recognition control section 15 which fulfills a voice recognition function, and a verbal telephone directory memory section 16.

The key service unit 2 further comprises a power supply section 21, a handset 22, a call circuit section 23 connected to the handset 22, and a main unit interface 24 for connecting the call circuit section 23 to the main unit 1. The main unit interface 24 is connected to a key matrix section 25, an LED (light-emitting diode) display 26, and an LCD (liquid-crystal display) 27.

With the foregoing circuit configuration, when the key service unit 2 is connected to the main unit 1, a d.c. power supply to be used by the key service unit 2 is generated. When the handset 22 of the key service unit 2 is picked up from a hook and dial buttons are pressed, the key matrix 25 detects data related to the thus-dialed telephone number and sends the dial data to the system control section 12 by way of the main unit interface 24 and the extension interface 14.

If the dial data requires a local call within the station, the system control section 12 connects a communication channel of the station interface 13 to a communication channel of the extension interface 14, enabling the user to make a call from the hand set 22 by way of the main unit interface 24 and the call circuit section 23 of the key service unit 2.

In a case where information relating to the state of the call at this time, the system control section 12 provided in the main unit 1 controls the LED display 26 and the LCD 27 by way of the extension interface 14 and the main unit interface 24 so as to display predetermined information.

Next, the voice recognition function will be described. When a key of the key service unit 2 used for bringing the key service unit into a voice recognition mode is pressed, the key matrix 25 detects data relating to the thus-pressed key and transmits the thus-detected data to the system control section 12 by way of the min unit interface 24 and the extension interface 14.

The system control section 12 connects the voice recognition control section 15 to the key service unit 2 and sounds a beep by way of the extension interface 14, the main unit interface 24, the call circuit 23, and the handset 22 to let the user know the connection. Further, pre-registered display data are transmitted to and displayed on the LCD 27 by way of the extension interface 14 and the main unit interface 24, thereby urging the user to perform a verbal input operation.

The user performs a verbal input operation according to instructions. The thus-input signal is compared with data which are stored in the verbal telephone directory memory section 16 beforehand and which respond to unspecified calling parties. If there is a match between the input signal and the data, the voice recognition control section 15 transmits dial information relating to the name of the calling party and dials a telephone number corresponding to the phone-number information. In this way, it is possible even for the existing key service unit to fulfill the voice recognition function.

As mentioned previously, since the existing PBX or KSU has the control section for fulfilling the voice recognition function, the voice recognition function of the PBX or KSU is set so as to respond to unspecified calling parties because of a necessity to allow all the users of the KSU to make a phone call, resulting in an insufficient rate of recognition of every user. Further, another problem of the existing PBX or KSU is that an operating guide is provided for the user only in the form of a message on the LCD and a beep sound, which makes it difficult for the user to use the PBX or KSU.

SUMMARY OF THE INVENTION

The present invention has been conceived to solve the foregoing problems in the existing PBX or KSU, and the object of the present invention is to provide a telephone system for voice recognition which has superior voice recognition performance and operability.

A telephone system for voice recognition according to the present invention is characterized by the feature that the telephone system to be connected to a main unit of a private branch exchange or a key service unit comprises a verbal telephone directory memory section for storing information relating to the voice of the user (hereinafter often referred to as "voice information") and information relating to telephone numbers (hereinafter often referred to as "phone-number information"), a control section which recognizes user's input voice by means of the voice information and which controls a dialing operation on the basis of the phone-number information, and a predetermined guidance memory section which stores instruction data used for giving instructions to the user in the form of voice or an indication.

By virtue of the present invention, there is provided a telephone system for voice recognition having superior voice recognition performance and operability.

DETAILED DESCRIPTION OF THE PREFERRED EMBODIMENTS

Figure 1:
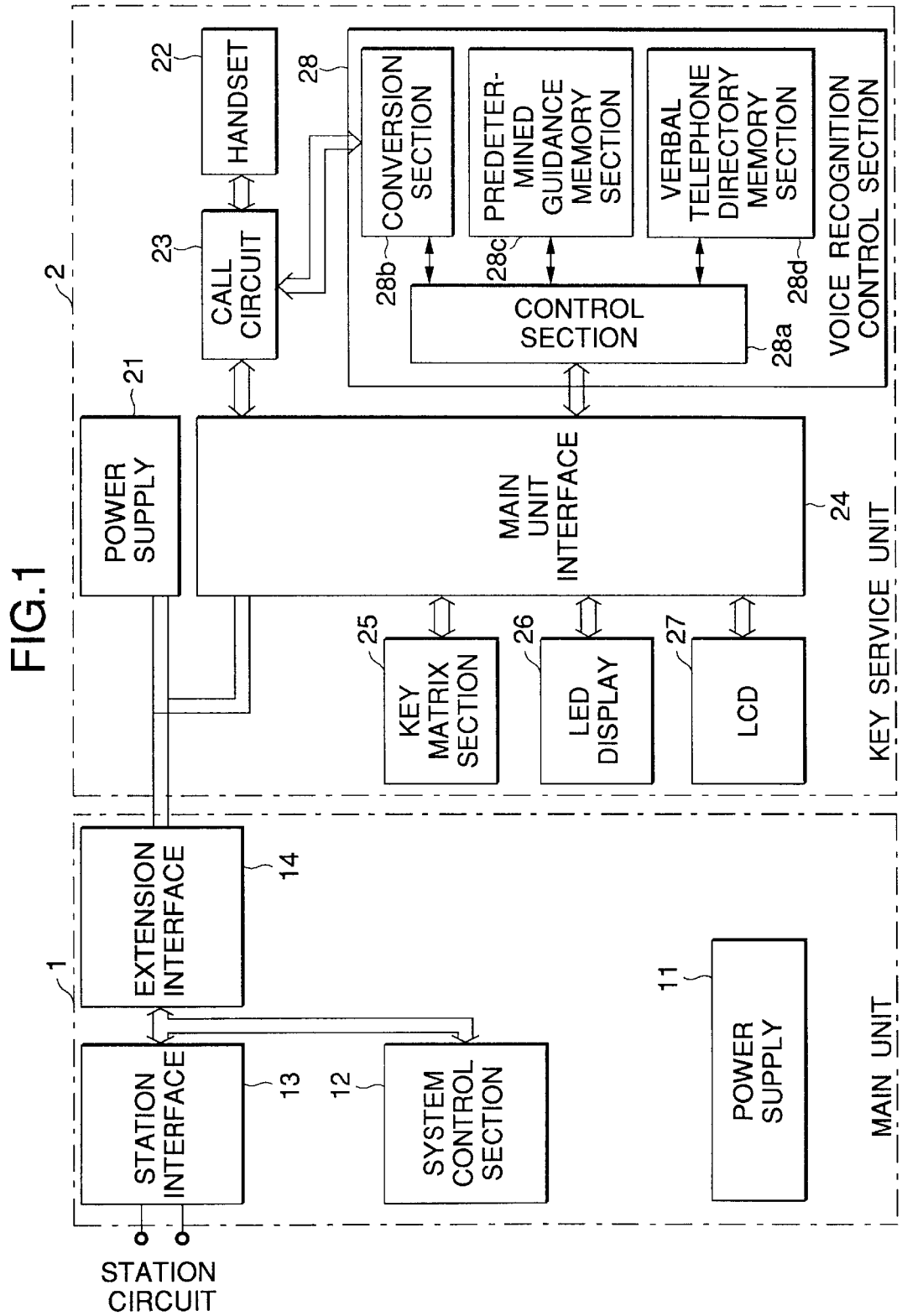
FIG. 1 is a block diagram showing a key service unit which embodies a telephone system for voice recognition according to the present invention.

The invention according to aspect 1 of the present patent application is directed to a telephone system for voice recognition to be connected to a main unit of a private branch exchange or a key service unit, the telephone system comprising a verbal telephone directory memory section for storing information relating to the voice and telephone number of the user, a control section which recognizes user's input voice by means of the voice information and which controls a dialing operation on the basis of the phone-number information, and a predetermined guidance memory section which stores instruction data used for giving instructions to the user in the form of voice or an indication.

According to the present invention, when the user performs a verbal input operation and a dialing operation in accordance with predetermined instructions at the time of registration of voice and phone numbers, the control section stores information relating to the voice of the user (hereinafter often referred to as "voice information") and information relating to telephone numbers (hereinafter often referred to as "phone-number information") into the verbal telephone directory memory section. When a phone number is dialed by voice, analogous information is extracted from the memory on the basis of user's input voice and the information stored in the verbal telephone directory memory section. After in accordance with instructions the user has made certain that the thus-extracted information is correct, the PBX or the main unit dials the telephone number.

The invention according to aspect 2 of the present patent application is directed to a telephone system comprising: a basic unit including a station interface section and a call circuit; a verbal telephone directory memory section which stores information relating to the voice and telephone number of the user; a control section which recognizes user's input voice on the basis of the voice information and controls a dialing operation on the basis of the phone-number information; and a predetermined guidance memory section which stores instruction data used for giving instructions to the user in the form of voice or an indication.

According to the present invention, when the user inputs voice and telephone numbers in accordance with instructions at the time of registration of voice and phone numbers, the control section stores information relating to the user's voice (hereinafter often referred to as "voice information") and information relating to phone numbers (hereinafter referred to as "phone-number information") in the verbal telephone directory memory section. When a telephone number is dialed by voice, analogous information is extracted from the memory section by means of the user's input voice and the information stored in the verbal telephone directory memory section. After in accordance with instructions the user has made certain that the information is correct, the basic unit dials the telephone number.

Embodiments of the present invention will be described hereinbelow by reference to the accompanying drawings.

First Embodiment

FIG. 1 is a block diagram showing a telephone system for voice recognition according to the present invention; that is, a key service system which comprises a main unit 1 and a key service unit 2 connected to the main unit 1. The main unit 1 may be a private branch exchange (PBX).

The main unit 1 is equipped with a power supply 11 and a system control section 12, and the system control section 12 is connected to a station interface 13 connected to a station circuit and an extension interface 14 connected to the key service unit 2.

The key service unit 2 comprises a power supply 21, a handset 22, a call circuit 23 connected to the handset 22, and a main unit interface 24 which connects the call circuit 23 to the main unit 1. The main unit interface 24 is connected to a key matrix section 25, an LED display 26, and an LCD 27.

The key service unit 2 is also equipped with a voice recognition control section 28 for the purpose of fulfilling a voice recognition function. The voice recognition control section 28 comprises therein a control section 28a connected to the main unit interface 24, a conversion section 28b connected to the control section 28a, a predetermined guidance memory section 28c, and a verbal telephone directory memory section 28d. The conversion section 28b converts an analog signal to a digital signal, and vice versa, and is also connected to the call circuit 23.

With the foregoing configuration, the basis function of the key service unit 2 is the same as that of the key service unit previously described for the existing telephone system for voice recognition. Therefore, a detailed description of the key service unit 2 will be omitted here, and an explanation will be given solely of the operation of the voice recognition function.

When a key used for bringing the key service unit into a voice recognition mode is pressed while the handset 22 is held off from the key service unit 2, the key matrix section 25 detects the pressing action of the key and sends a detection signal to the control section 28a of the voice recognition control section 28 by way of the main unit interface 24. In such a case, contrasted with the existing telephone system for voice recognition, the detection signal is not transmitted to the system control section 12 provided in the main unit.

When the key service unit 2 enters the voice recognition mode, the control section 28a provided in the voice recognition control section 28 reads pre-registered predetermined instructions from the predetermined guidance memory 28c, and the conversion section 28a converts the thus-read instructions of digital data into an analog signal. The instructions are verbally given to the user from the handset 22 by way of the call circuit 23.

When the user inputs his voice in accordance with instructions at the time of registration of voice and phone numbers, the control section 28a converts the voice signal input from the handset 22 by way of the call circuit 23 into digital data, using the conversion section 28b. The thus-converted digital data are stored in the verbal telephone directory memory section 28d.

Next, the predetermined instructions are heard from the handset 22, urging the user to input a telephone number. When the user inputs a telephone number, the key matrix 25 detects the thus-input phone-number information, and the main unit interface 24 transmits the thus-detected phone-number information to the control section 28a of the voice recognition control section 28. Similar operations are performed even at the time of edition of the telephone number already registered in the key service unit. Since the data relating to the voice of the user and the data relating to the telephone numbers are stored, the key service unit becomes possible to respond to a specific calling party.

Predetermined instructions are heard at the time of verbal dialing of a telephone number, as in the case of registration of telephone numbers. When voice is input, as in the case of registration of telephone numbers, the control section 28a extracts the name of a called party analogous to the registered data set among the contents of the verbal telephone directory memory section 28d. The key service give instructions to the user so as to check whether or not the name of the thus-extracted data set is correct.

If the name of the called party is correct, the user verbally inputs from the handset 22 the fact that the name of the called party is correct, and the result of such check is transmitted to the control section 28a, as in the case of registration of telephone numbers. Upon receipt of the result, the control section 28a transmits the phone-number data to the system control section 12 from the verbal telephone directory memory section 28d by way of the main unit interface 24 and the extension interface 14. The key service unit dials the telephone number of the called party.

Simultaneously with the instructions being heard, the control section 28a provided in the voice recognition control section 28 displays the contents of the instructions on the LCD 27 by way of the main unit interface section 24.

Second Embodiment

Figure 2:
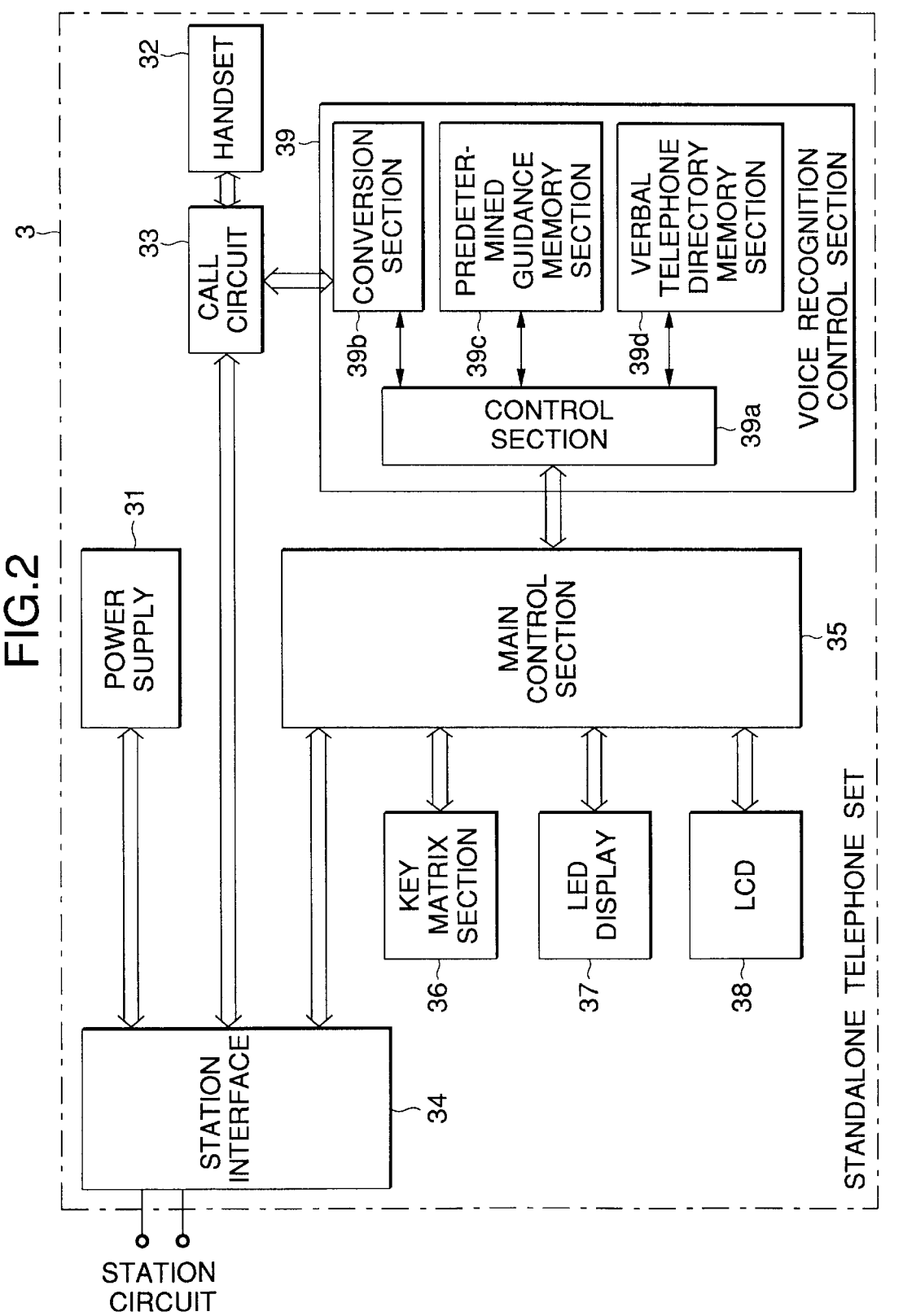
FIG. 2 is a block diagram showing a standalone telephone set which embodies the telephone system for voice recognition according to the present invention.
Figure 3:
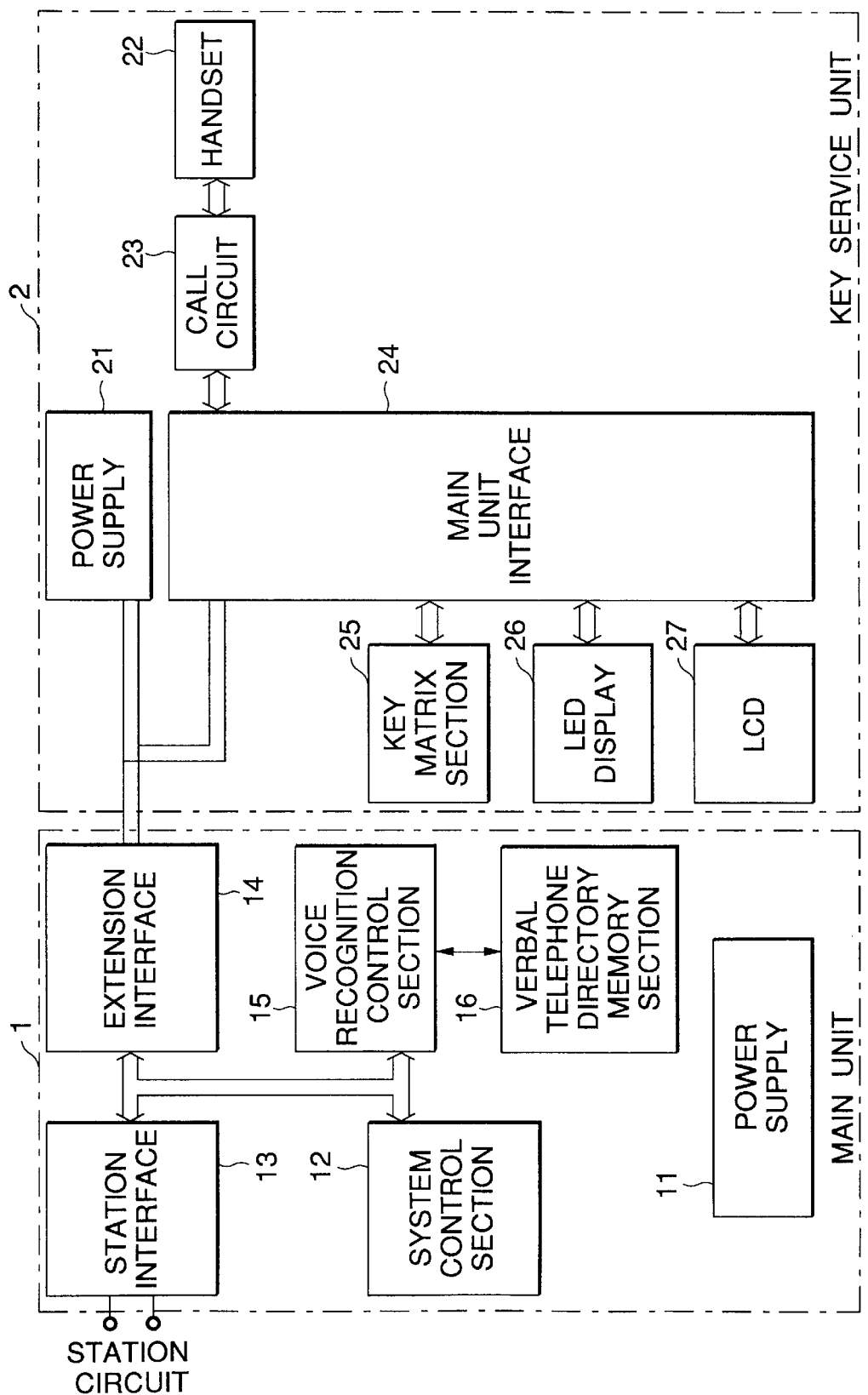
FIG. 3 is a block diagram showing a key service unit which is an existing voice recognition telephone set.

FIG. 2 is a block diagram showing a telephone system for voice recognition according to the present invention; that is, a standalone telephone set 3 having a voice recognition function.

The standalone telephone set 3 comprises a power supply 31, a handset 32, a call circuit 33 connected to the handset 32, a station interface 34 which connects the call circuit 33 to a station circuit, and a main control section 35 connected to the station interface 34.

The main control section 35 is connected to a key matrix section 36, an LED display 37, an LCD 38, and a voice recognition control section 39 for the purpose of fulfilling a voice recognition function.

The voice recognition control section 39 comprises therein a control section 39a connected to the main control section 35, a conversion section 39b, a predetermined guidance memory section 39c, and a verbal telephone directory memory section 39d. The conversion section 39b converts an analog signal to a digital signal, and vice versa, and is also connected to the call circuit 35.

With the foregoing circuit configuration, when a key used for bringing the key service unit into a voice recognition mode is pressed while the handset 32 is held off from the standalone telephone set 3, the key matrix section 36 detects the pressing action of the key and sends a detection signal to the control section 39a of the voice recognition control section 39 by way of the main control section 35.

When the telephone set 3 enters the voice recognition mode, the control section 39a provided in the voice recognition control section 39 reads pre-registered predetermined instructions from the predetermined guidance memory 39c, and the conversion section 39d converts the thus-read instructions of digital data into an analog signal. The instructions are verbally given to the user from the handset 32 by way of the call circuit 33.

When the user inputs his voice in accordance with instructions at the time of registration of voice and phone numbers, the control section 39a converts the voice signal input from the handset 32 by way of the call circuit 33 into digital data, using the conversion section 39b. The thus-converted digital data are stored in the verbal telephone directory memory section 39d.

Next, the predetermined instructions are heard from the handset 32, urging the user to input a telephone number. When the user inputs a telephone number, the key matrix 36 detects the thus-input phone-number information, and the main control section 35 transmits the thus-detected phone-number information to the control section 39a of the voice recognition control section 39. The information is then stored in the verbal telephone directory memory section 39d as phone-number data. Even at the time of registration of the names of called parties, operations analogous to those mentioned previously are performed. In this way, since the data relating to the voice of the user and the data relating to the telephone numbers are stored, the standalone telephone set becomes possible to respond to a specific calling party.

Predetermined instructions are heard at the time of verbal dialing of a telephone number, as in the case of registration of telephone numbers. When voice is input, as in the case of registration of telephone numbers, the control section 39a extracts the name of a called party analogous to the registered data set among the contents of the verbal telephone directory memory section 39d. The key service give instructions to the user so as to check whether or not the name of the thus-extracted data set is correct.

If the name of the called party is correct, the user verbally inputs from the handset 32 the fact that the name of the called party is correct, and the result of such check is transmitted to the control section 39a, as in the case of registration of telephone numbers. Upon receipt of the result, the control section 39a transmits the phone-number data to the main control section 35 from the verbal telephone directory memory section 39d. The standalone telephone set dials the telephone number of the called party.

Simultaneously with the instructions being heard, the control section 39a provided in the voice recognition control section 39 displays the contents of the instructions on the LCD 38 by way of the main control section 35.

According to the present invention, by virtue of a control section and a verbal telephone directory memory section provided in a key service unit or a standalone telephone set for the purpose of fulfilling a voice recognition function, the user of the unit or telephone set can be specified, resulting in an improvement in a rate of voice recognition.

Verbally giving predetermined instructions to the user enables the user to perform, by voice and only in the form of a conversation, all the operations required to register telephone numbers to a verbal telephone directory or to dial a telephone number, resulting in a significant improvement in the operability of the telephone system for voice recognition.

What is claimed is:

1. A telephone system for voice recognition to be connected to a main unit of a private branch exchange or a key service unit, said system for voice recognition comprising:
   a verbal telephone directory memory section for storing user voice information and user telephone directories;
   a control section which receives an input voice from a calling user, which retrieves a telephone number corresponding to the input voice from the verbal telephone directory memory section; and
   an interface unit for communicating the telephone number to a system control section of the main unit for controlling a dialing operation of the telephone number.

2. A method for providing user access to a verbal telephone directory comprising the steps of:
   storing user voice information;
   storing a user telephone directory in a telephone directory memory section;
   receiving an input voice from a calling user, performed after the step of storing user voice information;
   accessing, by a control section of a system for voice recognition, a telephone number in the user telephone directory which corresponds to the input voice; and
   providing the telephone number, by the control section, to a system control section of a main unit of a private branch exchange or a key service unit to which the system for voice recognition is connected.

* * * * *

UNITED STATES PATENT AND TRADEMARK OFFICE
CERTIFICATE OF CORRECTION

PATENT NO. : 6,647,097 B1 Page 1 of 1
DATED : November 11, 2003
INVENTOR(S) : Masami Nashirozawa It is certified that error appears in the above-identified patent and that said Letters Patent is hereby corrected as shown below:

Title page,
Item [56], References Cited, FOREIGN PATENT DOCUMENTS, please delete
"JP    6-2849    2/2000", and insert therefor -- JP    6-2849    1/1994 --.

Column 6,
Line 42, please delete "section for", and insert therefor -- section within a voice recognition control section for --.
Line 44, please delete "section which", and insert therefor -- section within the voice recognition control section which --.
Line 56, please delete "section;", and insert therefor -- section within a voice recognition control section; --.
Line 59, please delete "section of", and insert therefor -- section within the voice recognition control section of --.

Signed and Sealed this

Twenty-third Day of March, 2004

JON W. DUDAS
*Acting Director of the United States Patent and Trademark Office*